(12) United States Patent  
Wu

(10) Patent No.: US 10,218,474 B2  
(45) Date of Patent: Feb. 26, 2019

(54) DEVICE AND METHOD OF HANDLING SCHEDULING REQUEST TRANSMISSION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/250,939

(22) Filed: Aug. 30, 2016

(65) Prior Publication Data

US 2017/0064732 A1  Mar. 2, 2017

Related U.S. Application Data

(60) Provisional application No. 62/213,126, filed on Sep. 2, 2015.

(51) Int. Cl.
*H04W 72/12* (2009.01)
*H04L 5/00* (2006.01)

(52) U.S. Cl.
CPC ....... *H04L 5/0035* (2013.01); *H04W 72/1284* (2013.01); *H04W 72/1268* (2013.01)

(58) Field of Classification Search
CPC .... H04L 5/0035; H04L 5/00; H04W 72/1284; H04W 72/1268; H04W 72/12
See application file for complete search history.

(56) References Cited

U.S. PATENT DOCUMENTS

| 2014/0056271 A1* | 2/2014 | Ahn | H04W 52/146 370/329 |
| 2014/0293898 A1* | 10/2014 | Tseng | H04W 24/02 370/329 |
| 2015/0312930 A1* | 10/2015 | Han | H04W 72/1247 370/336 |
| 2016/0270110 A1* | 9/2016 | Dinan | H04L 5/0053 |

(Continued)

FOREIGN PATENT DOCUMENTS

EP  2 705 625 B1  3/2015

OTHER PUBLICATIONS

Huawei, HiSilicon, "Issues for SR on PUCCH Scell", 3GPP TSG-RAN WG2 Meeting #90, R2-152273, May 25-29, 2015, Fukuoka, Japan, XP050972250, pp. 1-3.*

(Continued)

*Primary Examiner* — Charles C Jiang
*Assistant Examiner* — Kyaw Z Soe
(74) *Attorney, Agent, or Firm* — Winston Hsu

(57) ABSTRACT

A communication device for handling scheduling request (SR) transmissions comprises a storage unit for storing instructions and a processing circuit coupled to the storage unit. The processing circuit is configured to execute the instructions stored in the storage unit. The instructions comprise being configured to communicate with a first cell and a second cell; being configured a first SR period for a first SR transmission on the first cell and a second SR period for a second SR transmission on the second cell, wherein the (Continued)

second SR period is smaller than the first SR period; starting a SR prohibit timer according to the second SR period; receiving a radio resource control (RRC) message and releasing the second SR transmission in response to the RRC message; and keeping the SR prohibit timer running in response to the release of the second SR transmission.

14 Claims, 5 Drawing Sheets

(56) References Cited

U.S. PATENT DOCUMENTS

2016/0270114 A1* 9/2016 Dinan ................. H04L 5/0053

OTHER PUBLICATIONS

Huawei, HiSilicon, "Issues for SR on PUCCH Scell", 3GPP TSG-RAN WG2 Meeting #90, R2-152273, May 25-29, 2015, Fukuoka, Japan, XP 050972250, p. 1-3 (Year: 2015).*

Huawei, HiSilicon, "Issues for SR on PUCCH Scell", 3GPP TSG-RAN WG2 Meeting #90, R2-152273, May 25-29, 2015,Fukuoka, Japan, XP 050972250, p. 1-3 (Year: 2015) (Year: 2015).*

Office action dated Apr. 24, 2017 for the Taiwan application No. 105127953, filing date Aug. 31, 2016, p. 1-7.

Search Report dated Jan. 24, 2017 for EP application No. 16186595. 1, pp. 1-10.

CATT, "PUCCH SCell Configuration", 3GPP TSG RAN WG2 Meeting #91, R2-153504, Aug. 24-28, 2015, Beijing, China, XP051004216, pp. 1-6.

HTC, "Discussion on SR prohibition time and D-SR failure", 3GPP TSG-RAN WG2 #91, R2-153467, Aug. 24-28, 2015, Beijing, P.R.China, XP051004183, pp. 1-2.

3GPP TS 36.300 V12.4.0 (Dec. 2014) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).

3GPP TSG-RAN WG2 Meeting #91 R2-153963 Beijing, China, Aug. 24-28, 2015 CR-Form-v11.1 Change Request 36.300 CR xxxx rev—Current version: 13.0.0 Title: Running 36.300 CR to capture agreements on carrier aggregation enhancements Source to WG: Nokia Corporation (Rapporteur) Source to TSG: R2 Work item code: LTE_CA_enh_b5C-Core Date: Aug. 28, 2015.

3GPP TS 36.331 V12.6.0 (Jun. 2015) Technical Specification 3rd Generation Partnership Project; Technical Specification Group Radio Access Network; Evolved Universal Terrestrial Radio Access (E-UTRA); Radio Resource Control (RRC); Protocol specification (Release 12).

3GPP TS 36.213 V12.5.0 (Mar. 2015) Technical Specification 3rd Generation Partnership Project; Technical Specification Group Radio Access Network; Evolved Universal Terrestrial Radio Access (E-UTRA); Physical layer procedures (Release 12).

3GPP TSG-RAN WG2 Meeting #91 R2-15XXXX Beijing, P.R. China, Aug. 24-28, 2015 CR-Form-v11.1 Change Request 36.321 CR—rev—Current version: 12.6.0 Title: Running MAC CR for Carrier Aggregation enhancements Source to WG: Ericsson Source to TSG: R2 Work item code: LTE_CA_enh_b5C-Core Date: Aug. 28, 2015.

3GPP TSG-RAN WG2 Meeting #91 R2-153459 Beijing, China, Aug. 24-27, 2015 CR-Form-v11.1 Change Request Proposed change affects: UICC apps ME X Radio Access Network X Core Network Title: Running 36.331 CR for capturing B5C and PUCCH on SCell Source to WG: Nokia Networks Source to TSG: R2 Work item code: LTE_CA_enh_b5C-Core Date: Aug. 28, 2015.

* cited by examiner

DEVICE AND METHOD OF HANDLING SCHEDULING REQUEST TRANSMISSION

CROSS REFERENCE TO RELATED APPLICATIONS

This application claims the benefit of U.S. Provisional Application No. 62/213,126 filed on Sep. 2, 2015, which is incorporated herein by reference.

BACKGROUND OF THE INVENTION

1. Field of the Invention

The present invention relates to a device and a method used in a wireless communication system, and more particularly, to a device and a method of handling a scheduling request transmission.

2. Description of the Prior Art

A long-term evolution (LTE) system provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system is an evolution of the LTE system. The LTE-A system extends cell coverage of an eNB, increases peak data rate and throughput, and includes advanced techniques, such as carrier aggregation (CA), licensed-assisted access (LAA) using LTE, etc.

According to the prior art, a UE can only transmit a scheduling request (SR) to a primary cell (PCell) of an eNB. Recently, it is proposed that the SR can also be transmitted to a secondary cell (SCell) of the eNB to improve flexibility of SR transmission. Accordingly, mechanisms such as control of a SR prohibit timer only designed for the PCell cannot be applied to the case of the SCell. The UE and/or the eNB cannot operate regularly, if the mechanisms are used for the SCell.

Thus, how to handle the SR transmission is an important problem to be solved.

SUMMARY OF THE INVENTION

The present invention therefore provides a communication device and method for handling a scheduling request transmission to solve the abovementioned problem.

A communication device for handling scheduling request (SR) transmissions comprises a storage unit for storing instructions and a processing circuit coupled to the storage unit. The processing circuit is configured to execute the instructions stored in the storage unit. The instructions comprise being configured to communicate with a first cell and a second cell; being configured a first SR period for a first SR transmission on the first cell and a second SR period for a second SR transmission on the second cell, wherein the second SR period is smaller than the first SR period; starting a SR prohibit timer according to the second SR period; receiving a radio resource control (RRC) message and releasing the second SR transmission in response to the RRC message; and keeping the SR prohibit timer running in response to the release of the second SR transmission.

A communication device for handling scheduling request (SR) transmissions comprises a storage unit for storing instructions and a processing circuit coupled to the storage unit. The processing circuit is configured to execute the instructions stored in the storage unit. The instructions comprise being configured to communicate with a first cell and a second cell; being configured a first SR period for a first SR transmission on the first cell and a second SR period for a second SR transmission on the second cell, wherein the second SR period is smaller than the first SR period; starting a SR prohibit timer according to the second SR period; receiving a radio resource control (RRC) message and releasing the second SR transmission in response to the RRC message; and stopping the SR prohibit timer or determining the SR prohibit timer as expired in response to the release of the second SR transmission.

A communication device for handling scheduling request (SR) transmissions comprises a storage unit for storing instructions and a processing circuit coupled to the storage unit. The processing circuit is configured to execute the instructions stored in the storage unit. The instructions comprise being configured to communicate with a first cell and a second cell; being configured a first SR period for a first SR transmission on the first cell and a second SR period for a second SR transmission on the second cell, wherein the second SR period is smaller than the first SR period; starting a SR prohibit timer according to the second SR period; receiving a radio resource control (RRC) message and releasing the second SR transmission in response to the RRC message; and restarting the SR prohibit timer according to the first SR period in response to the release of the second SR transmission.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
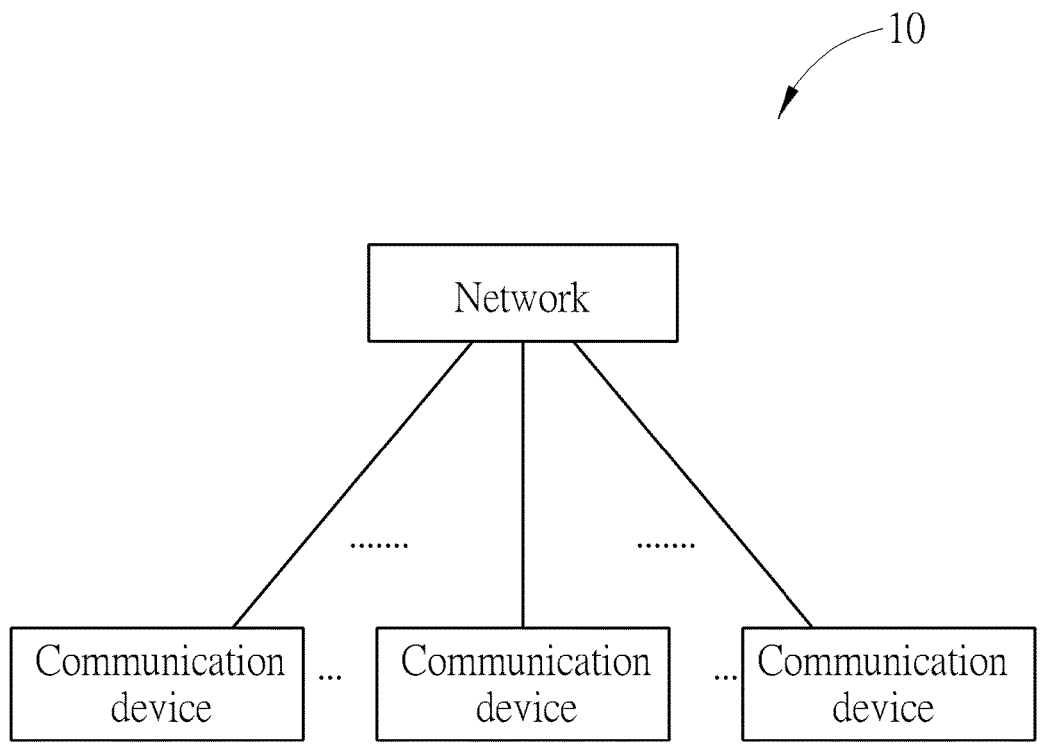
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may simultaneously communicate with each other via multiple cells (e.g., multiple carriers) including a primary cell (PCell) and one or more secondary cells (SCells). The abovementioned cells may be operated in the same or different frame structure types, or in the same or different duplexing modes, i.e. frequency-division duplexing (FDD) and time-division duplexing (TDD). For example, the PCell may be operated on a licensed carrier, while the SCell may be operated on an unlicensed carrier.

In FIG. 1, the network and the communication devices are simply utilized for illustrating the structure of the wireless communication system 10. Practically, the network may be an evolved universal terrestrial radio access network (E-UTRAN) including at least one evolved Node-B (eNB) and/or at least one relay in a long term evolution (LTE) system, a LTE-Advanced (LTE-A) system or an evolution of the LTE-A system. The network may be a fifth generation (5G) network including at least one 5G base station (BS) which employs orthogonal frequency-division multiplexing (OFDM) and/or non-OFDM, and transmission time interval (TTI) shorter than 1 ms (e.g. 100 or 200 microseconds) for communication with the communication devices. In general, a base station (BS) may also be used to refer any of the NB, the RNC, the eNB and the 5G BS.

A communication device may be a user equipment (UE), a machine type communication (MTC) device, a mobile phone, a laptop, a tablet computer, an electronic book, a portable computer system, a vehicle, an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
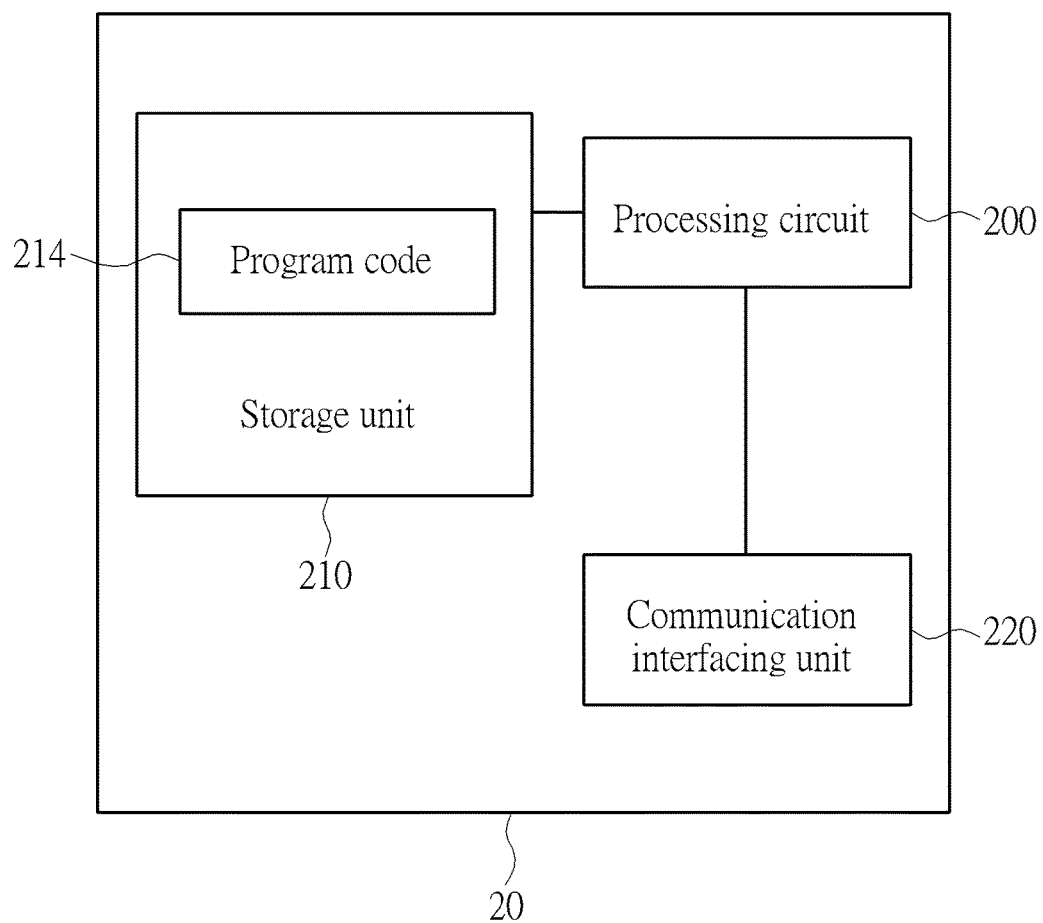
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage unit 210 and a communication interfacing unit 220. The storage unit 210 may be any data storage device that may store a program code 214, accessed and executed by the processing circuit 200. Examples of the storage unit 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing circuit 200.

In the following embodiments, a UE is used to represent a communication device in FIG. 1, to simplify the illustration of the embodiments.

Figure 3:
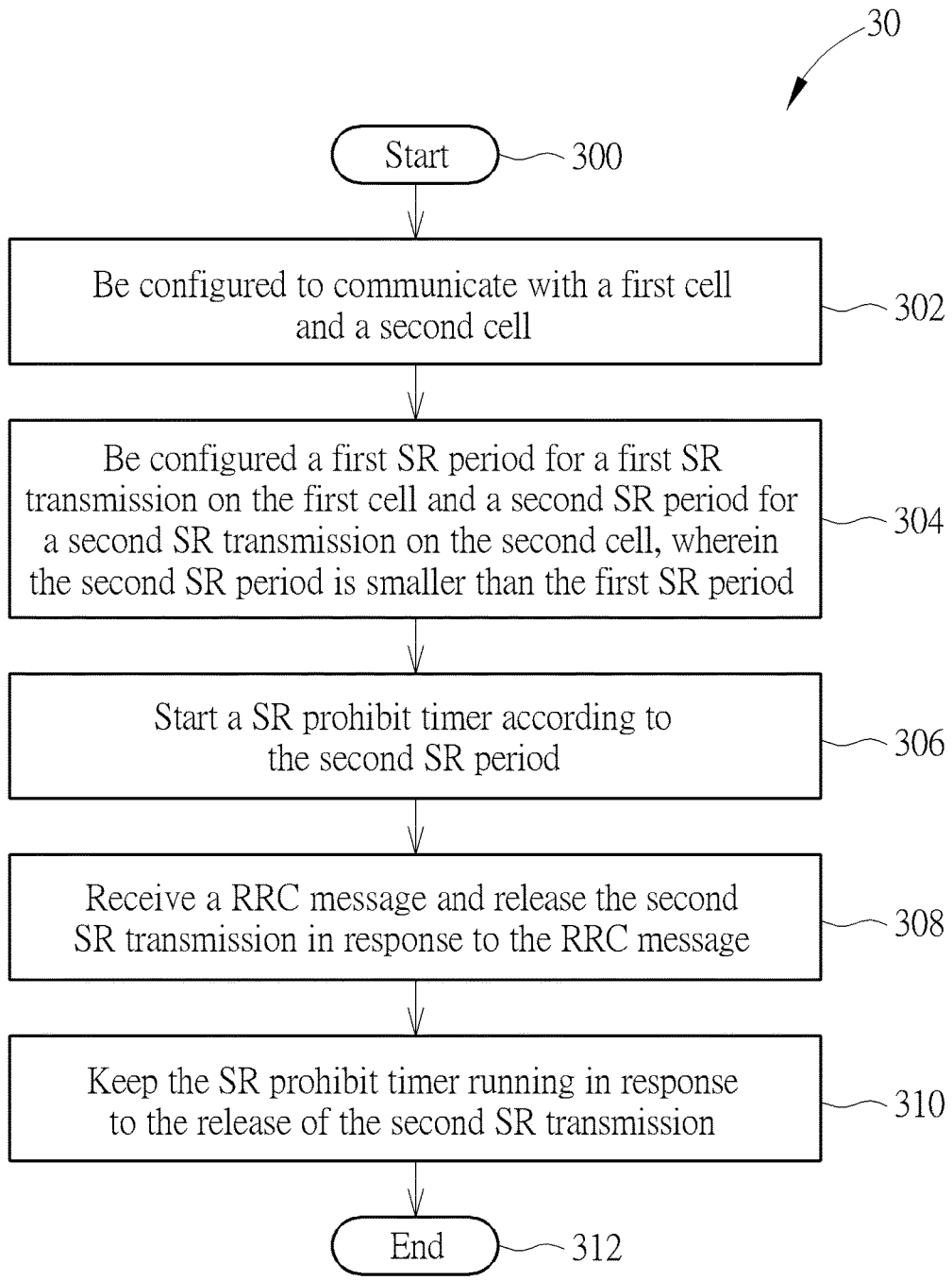
FIG. 3 is a flowchart of a process according to an example of the present invention.

FIG. 3 is a flowchart of a process 30 according to an example of the present invention. The process 30 may be utilized in a UE, for handling scheduling request (SR) transmission(s). The process 30 may be compiled into the program code 214 and includes the following steps:

Step 300: Start.

Step 302: Be configured to communicate with a first cell and a second cell.

Step 304: Be configured a first SR period for a first SR transmission on the first cell and a second SR period for a second SR transmission on the second cell, wherein the second SR period is smaller than the first SR period.

Step 306: Start a SR prohibit timer according to the second SR period.

Step 308: Receive a radio resource control (RRC) message and release the second SR transmission in response to the RRC message.

Step 310: Keep the SR prohibit timer running in response to the release of the second SR transmission.

Step 312: End.

According to the process 30, the UE is configured by a BS to communicate with a first cell and a second cell (e.g., of the network in FIG. 1). The second cell may be a SCell, but is not limited herein. Further, the UE is configured by the BS a first SR period for a first SR transmission on the first cell and a second SR period for a second SR transmission on the second cell, wherein the second SR period is smaller than the first SR period. The UE starts a SR prohibit timer according to the second SR period. That is, the UE determines to use the second SR period if the second SR period is shorter than the first SR period. Otherwise, the UE determines to use the first SR period. After a while or according to a certain condition, the UE receives a RRC message (e.g., RRCConnectionReconfiguration message), and releases the second SR transmission in response to the RRC message. In addition, the UE keeps the SR prohibit timer running in response to the release of the second SR transmission. That is, the UE keeps the SR prohibit timer running to avoid the UE from performing the second SR transmission (i.e., transmitting a SR on the first cell or the second cell), even if the second SR transmission is released. Thus, the second cell is not flushed by SR(s) transmitted by the UE, and loading (e.g., congestion) of the second cell is not deteriorated.

Realization of the process 30 is not limited to the above description. The following examples may be applied to the process 30.

An example is illustrated as followed. A UE is connected to an eNB via a first cell (e.g., PCell) in a RRC connected mode. The eNB transmits to the UE an RRCConnectionReconfiguration message which configures the UE to communicate with a second cell (e.g., SCell) while communicating with the UE via the first cell. That is, the UE simultaneously communicates with the eNB via both the first and second cells. The UE is configured by the eNB to transmit a physical UL control channel (PUCCH) on the second cell. The UE receives from the eNB a first sr-ConfigIndex which configures a first SR period for a first SR transmission on the first cell and a second sr-ConfigIndex which configures a second SR period for a second SR transmission on the second cell. In one example, the first sr-ConfigIndex and the second sr-ConfigIndex are transmitted in a same RRCConnectionReconfiguration message, or are transmitted in different RRCConnectionReconfiguration messages. In another example, the first sr-ConfigIndex is transmitted in an RRCConnectionSetup message, and the second sr-ConfigIndex is transmitted in an RRCConnectionReconfiguration message. The UE determines the first SR period according to the first sr-ConfigIndex, and determines the second SR period according to the second sr-ConfigIndex.

When the UE determines to transmit or transmits a SR on the first cell or the second cell and the first SR period is smaller than the second SR period, the UE starts a SR prohibit timer according to the first SR period and sr-ProhibitTimer. When the UE transmits a SR on the first cell or the second cell and the first SR period is larger than the second SR period, the UE starts a SR prohibit timer according to the second SR period and sr-ProhibitTimer. The eNB transmits to the UE an RRCConnectionReconfiguration message which explicitly or implicitly configures the UE to release the second SR transmission. In one example, the term "explicitly" means that the RRCConnectionReconfiguration message explicitly indicates release of a SR configuration for the second SR transmission. In one example, the term "implicitly" means that the RRCConnectionReconfiguration message indicates release of a PUCCH configuration of the second cell or release of the second cell (e.g., sCellToReleaseList) instead of indicating the release of the SR configuration. To keep prohibiting the SR transmissions on the first cell and the second cell, the UE keeps the SR prohibit timer running in response to the RRCConnectionReconfiguration message. When the eNB releases the SR configuration for the UE, the eNB may assign SR resources of the UE indicated in the SR configuration to another UE by transmitting another SR configuration to the another UE. If the eNB does not assign the SR resources to any UE, the eNB will not detect the SR on the SR resources on the second cell. The SR resources may include at least one of time resource(s) (e.g., subframe or period), frequency resource(s) and/or code resource(s) for transmitting a SR.

In one example, the UE may perform the first SR transmission on the first cell, after the SR prohibit timer expires. The UE starts the SR prohibit timer according to the first SR period in response to the first SR transmission. That is, the UE starts the SR prohibit timer when transmitting a SR, and the UE transmits the SR when the SR prohibit timer expires. In one example, the RRC message may include a sCellToReleaseList for configuring the UE to release the second cell. In one example, the RRC message may include SchedulingRequestConfig for configuring the UE to release a SR configuration of the second cell.

Figure 4:
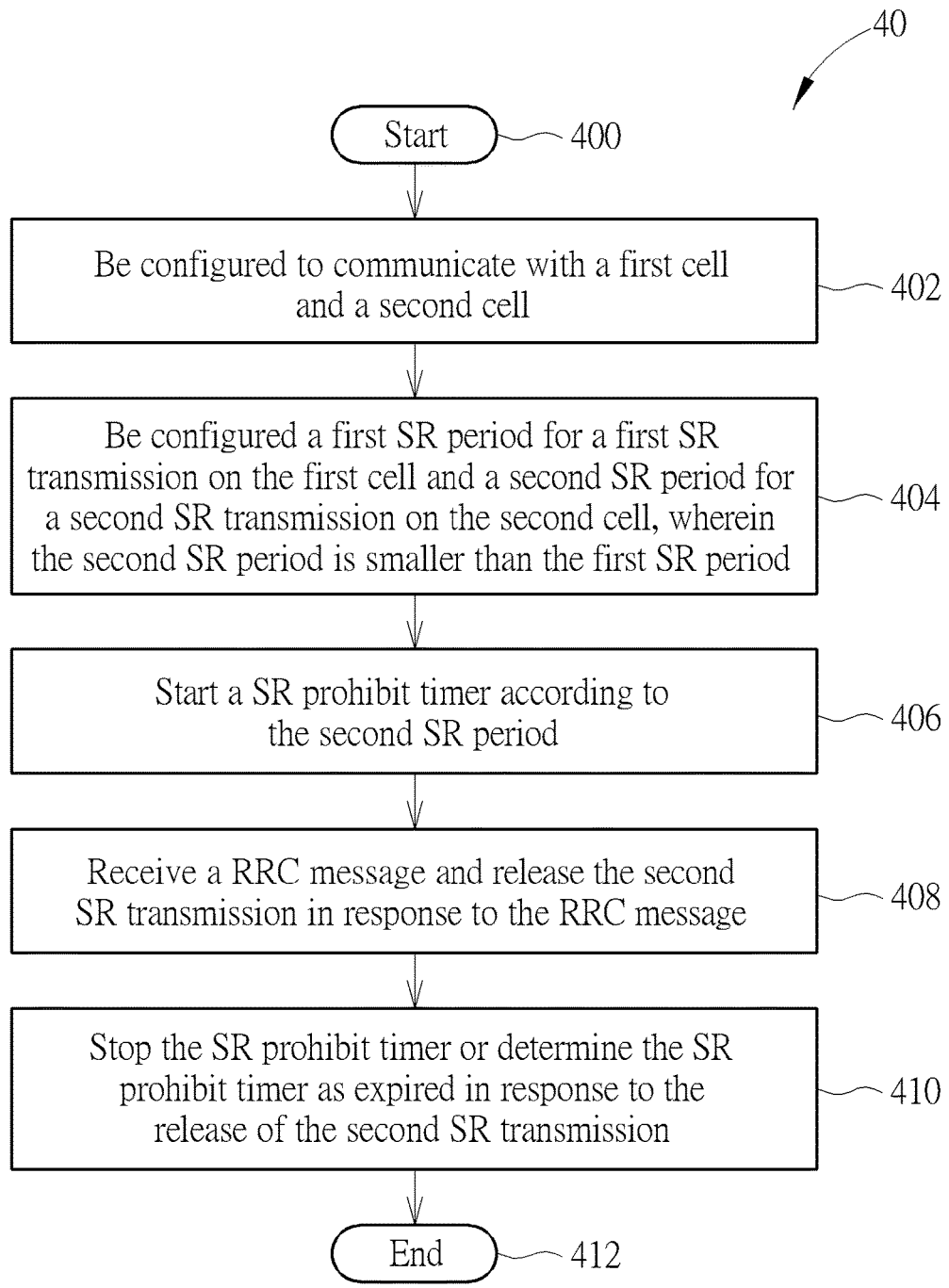
FIG. 4 is a flowchart of a process according to an example of the present invention.

FIG. 4 is a flowchart of a process 40 according to an example of the present invention. The process 40 may be utilized in a UE, for handling SR transmission(s). The process 40 may be compiled into the program code 214 and includes the following steps:

Step 400: Start.

Step 402: Be configured to communicate with a first cell and a second cell.

Step 404: Be configured a first SR period for a first SR transmission on the first cell and a second SR period for a second SR transmission on the second cell, wherein the second SR period is smaller than the first SR period.

Step 406: Start a SR prohibit timer according to the second SR period.

Step 408: Receive a RRC message and release the second SR transmission in response to the RRC message.

Step 410: Stop the SR prohibit timer or determine the SR prohibit timer as expired in response to the release of the second SR transmission.

Step 412: End.

According to the process 40, the UE is configured by a BS to communicate with a first cell and a second cell (e.g., of the network in FIG. 1). The second cell may be a SCell, but is not limited herein. Further, the UE is configured by the BS a first SR period for a first SR transmission on the first cell and a second SR period for a second SR transmission on the second cell, wherein the second SR period is smaller than the first SR period. The UE starts a SR prohibit timer according to the second SR period. After a while or according to a certain condition, the UE receives a RRC message (e.g., RRCConnectionReconfiguration message), and releases the second SR transmission in response to the RRC message. In addition, the UE stops the SR prohibit timer or determines the SR prohibit timer as expired in response to the release of the second SR transmission. That is, the UE stops the SR prohibit timer such that the UE is allowed to perform the first SR transmission (i.e., transmitting a SR). Thus, transmission of the SR is not delayed by the release of the second SR transmission, and throughput of the UE is improved.

Realization of the process 40 is not limited to the above description. The following examples may be applied to the process 40.

In one example, the UE may perform the first SR transmission on the first cell, after the SR prohibit timer expires. The UE starts the SR prohibit timer according to the first SR period in response to the first SR transmission. That is, the UE starts the SR prohibit timer when transmitting a SR, and the UE transmits the SR when the SR prohibit timer expires. In one example, the RRC message may include a sCellToReleaseList for configuring the UE to release the second cell. In one example, the RRC message may include SchedulingRequestConfig for configuring the UE to release a SR configuration of the second cell.

Figure 5:
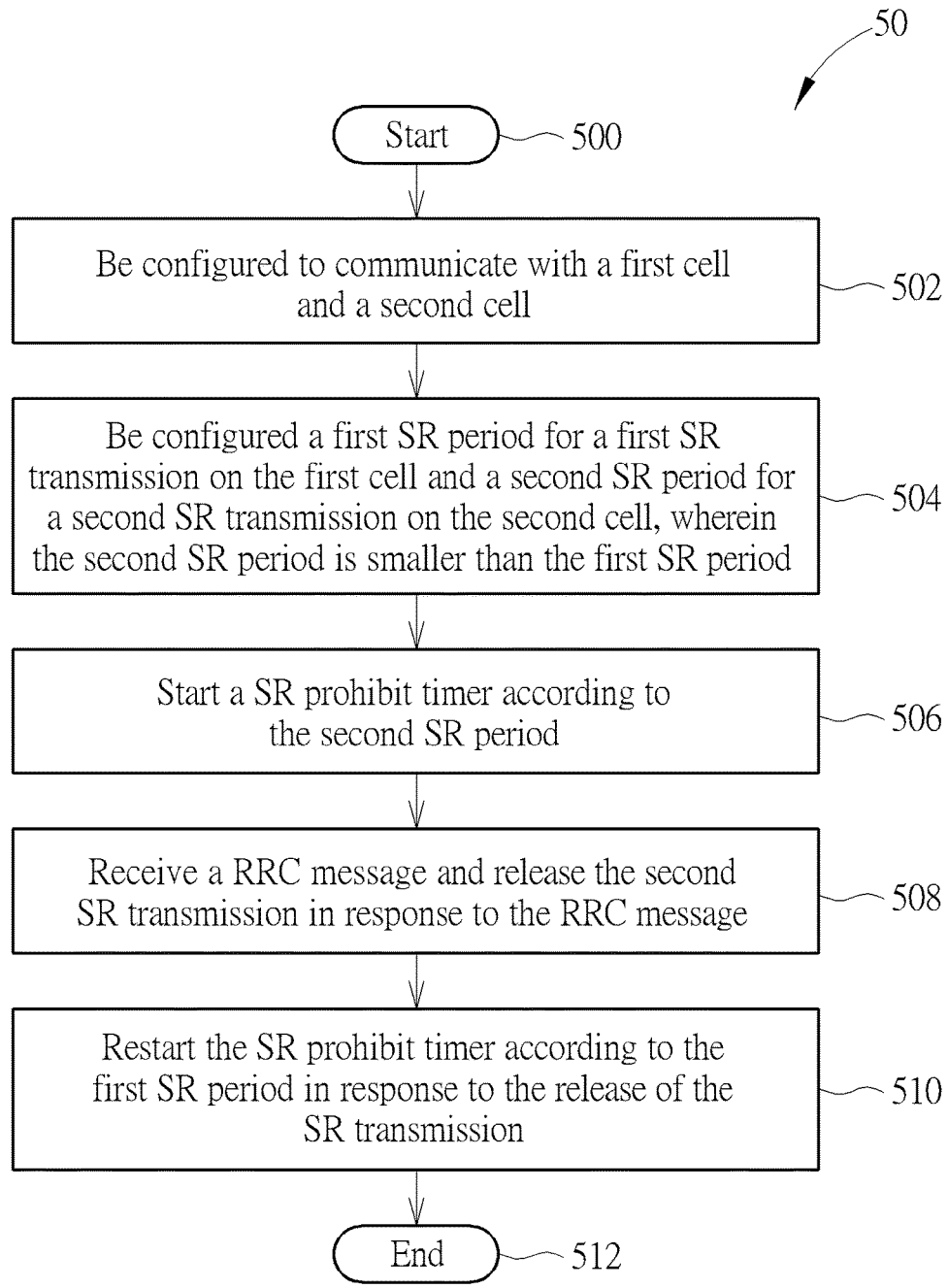
FIG. 5 is a flowchart of a process according to an example of the present invention.

FIG. 5 is a flowchart of a process 50 according to an example of the present invention. The process 50 may be utilized in a UE, for handling SR transmission(s). The process 50 may be compiled into the program code 214 and includes the following steps:

Step 500: Start.

Step 502: Be configured to communicate with a first cell and a second cell.

Step 504: Be configured a first SR period for a first SR transmission on the first cell and a second SR period for a second SR transmission on the second cell, wherein the second SR period is smaller than the first SR period.

Step 506: Start a SR prohibit timer according to the second SR period.

Step 508: Receive a RRC message and release the second SR transmission in response to the RRC message.

Step 510: Restart the SR prohibit timer according to the first SR period in response to the release of the second SR transmission.

Step 512: End.

According to the process 50, the UE is configured by a BS to communicate with a first cell and a second cell (e.g., of the network in FIG. 1). The second cell may be a SCell, but is not limited herein. Further, the UE is configured by the BS a first SR period for a first SR transmission on the first cell and a second SR period for a second SR transmission on the second cell, wherein the second SR period is smaller than the first SR period. The UE starts a SR prohibit timer according to the second SR period. After a while or according to a certain condition, the UE receives a RRC message (e.g., RRCConnectionReconfiguration message), and releases the second SR transmission in response to the RRC message. In addition, the UE restarts the SR prohibit timer according to the first SR period in response to the release of the second SR transmission. That is, the SR prohibit timer is restarted according to a longer period. Accordingly, the UE needs to wait for a longer time interval to perform the first SR transmission (i.e., transmitting a SR). Thus, the first cell is not flushed by SR(s) transmitted by the UE, and loading (e.g., congestion) of the first cell is not deteriorated.

Realization of the process 50 is not limited to the above description. The following examples may be applied to the process 50.

In one example, the UE may perform the first SR transmission on the first cell, after the SR prohibit timer expires. The UE starts the SR prohibit timer according to the first SR period in response to the first SR transmission. That is, the UE starts the SR prohibit timer when transmitting a SR, and the UE transmits the SR when the SR prohibit timer expires. In one example, the RRC message may include a sCellToReleaseList for configuring the UE to release the second cell. In one example, the RRC message may include SchedulingRequestConfig for configuring the UE to release a SR configuration of the second cell.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program code 214.

To sum up, the present invention provides a communication device and method of handling SR transmission(s), and various requirements can be satisfied. According to an example for avoiding overloading of a cell, the cell is not flushed by SR(s) transmitted by the communication device. According to an example for improving throughput of the communication device, transmission of a SR is not delayed by release of a SR transmission.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling scheduling request (SR) transmissions, comprising:
   a storage unit, for storing instructions of:
   being configured to communicate with a first cell and a second cell;
   being configured a first SR period for a first SR transmission on the first cell and a second SR period for a second SR transmission on the second cell, wherein the second SR period is smaller than the first SR period;
   starting a SR prohibit timer according to the second SR period;
   releasing a SR configuration or a physical uplink control channel (PUCCH) configuration for the second SR transmission;
   keeping the SR prohibit timer running in response to the release of the SR configuration or the release of the PUCCH configuration;
   performing the first SR transmission on the first cell, after the SR prohibit timer expires; and
   starting the SR prohibit timer according to the first SR period in response to the first SR transmission; and
   a processing circuit, coupled to the storage unit, configured to execute the instructions stored in the storage unit.

2. The communication device of claim 1, wherein the instructions further comprising:
   receiving a radio resource control (RRC) message, wherein the RRC message comprises a sCellToReleaseList for configuring the communication device to release the second cell, and the communication device releases the SR configuration in response to the RRC message.

3. The communication device of claim 1, wherein the instructions further comprising:
   receiving a RRC message, wherein the RRC message comprises a configuration information element for configuring the communication device to release a PUCCH of the second cell, and the communication device releases the PUCCH configuration in response to the RRC message.

4. The communication device of claim 1, wherein the instructions further comprising:
   receiving a RRC message, wherein the RRC message comprises a SchedulingRequestConfig for configuring the communication device to release a SR configuration of the second cell, and the communication device releases the second SR configuration in response to the RRC message.

5. A communication device for handling scheduling request (SR) transmissions, comprising:
   a storage unit, for storing instructions of:
   being configured to communicate with a first cell and a second cell;
   being configured a first SR period for a first SR transmission on the first cell and a second SR period for a second SR transmission on the second cell, wherein the second SR period is smaller than the first SR period;
   starting a SR prohibit timer according to the second SR period;
   releasing a SR configuration or a physical uplink control channel (PUCCH) configuration for the second SR transmission;
   stopping the SR prohibit timer or determining the SR prohibit timer as expired in response to the release of the SR configuration or the release of the PUCCH configuration; and
   performing the first SR transmission on the first cell, after the SR prohibit timer is determined as expired or is stopped; and
   a processing circuit, coupled to the storage unit, configured to execute the instructions stored in the storage unit.

6. The communication device of claim 5, wherein the instructions further comprising:
   starting the SR prohibit timer according to the first SR period in response to the first SR transmission.

7. The communication device of claim 5, wherein the instructions further comprising:
   receiving a radio resource control (RRC) message, wherein the RRC message comprises a sCellToReleaseList for configuring the communication device to release the second cell.

8. The communication device of claim 5, wherein the instructions further comprising:
   receiving a RRC message, wherein the RRC message comprises a configuration information element for configuring the communication device to release a PUCCH of the second cell.

9. The communication device of claim 5, wherein the instructions further comprising:
   receiving a RRC message, wherein the RRC message comprises a SchedulingRequestConfig for configuring the communication device to release a SR configuration of the second cell.

10. A communication device for handling scheduling request (SR) transmissions, comprising:
    a storage unit, for storing instructions of:
    being configured to communicate with a first cell and a second cell;
    being configured a first SR period for a first SR transmission on the first cell and a second SR period for a second SR transmission on the second cell, wherein the second SR period is smaller than the first SR period;

starting a SR prohibit timer according to the second SR period;
releasing the a SR configuration or a physical uplink control channel (PUCCH) configuration for the second SR transmission; and
restarting the SR prohibit timer according to the first SR period in response to the release of the SR configuration or the release of the PUCCH configuration; and
a processing circuit, coupled to the storage unit, configured to execute the instructions stored in the storage unit.

11. The communication device of claim 10, wherein the instructions further comprising:
performing the first SR transmission on the first cell, after the SR prohibit timer expires or is stopped; and
starting the SR prohibit timer according to the first SR period in response to the first SR transmission.

12. The communication device of claim 10, wherein the instructions further comprising:
receiving a radio resource control (RRC) message, wherein the RRC message comprises a sCellToReleaseList for configuring the communication device to release the second cell.

13. The communication device of claim 10, wherein the instructions further comprising:
receiving a RRC message, wherein the RRC message comprises a configuration information element for configuring the communication device to release a PUCCH of the second cell.

14. The communication device of claim 10, wherein the instructions further comprising:
receiving a RRC message, wherein the RRC message comprises a SchedulingRequestConfig for configuring the communication device to release a SR configuration of the second cell.

* * * * *